(12) United States Patent
Åkerberg et al.

(10) Patent No.: US 12,218,824 B2
(45) Date of Patent: Feb. 4, 2025

(54) IDENTIFICATION OF ROBUST WIRELESS ROUTING PATHS

(71) Applicant: ABB Schweiz AG, Baden (CH)

(72) Inventors: Johan Åkerberg, Västerås (SE);
Markus Eriksson, Uppsala (SE);
Tomas Olofsson, Knivsta (SE)

(73) Assignee: ABB Schweiz AG, Baden (CH)

( * ) Notice: Subject to any disclaimer, the term of this patent is extended or adjusted under 35 U.S.C. 154(b) by 312 days.

(21) Appl. No.: 17/289,857

(22) PCT Filed: Nov. 13, 2018

(86) PCT No.: PCT/EP2018/081022
§ 371 (c)(1),
(2) Date: Apr. 29, 2021

(87) PCT Pub. No.: WO2020/098914
PCT Pub. Date: May 22, 2020

(65) Prior Publication Data
US 2021/0409307 A1 Dec. 30, 2021

(51) Int. Cl.
H04W 40/14 (2009.01)
H04L 45/128 (2022.01)
H04L 45/24 (2022.01)

(52) U.S. Cl.
CPC ...... H04L 45/1287 (2013.01); H04L 45/1283 (2013.01); H04L 45/24 (2013.01); H04W 40/14 (2013.01)

(58) Field of Classification Search
CPC . H04L 45/1287; H04L 45/1283; H04L 45/24; H04L 45/128; H04W 40/14; H04W 40/12; H04W 84/18; Y02D 30/70
See application file for complete search history.

(56) References Cited

U.S. PATENT DOCUMENTS 6,751,746 B1    6/2004   Jain et al.
9,838,317 B1 *  12/2017  Yadav ................ H04L 43/0829
(Continued)

FOREIGN PATENT DOCUMENTS

EP    2034669 A1    3/2009
JP    2005252452 A  9/2005
WO   2014149158 A1  9/2014

OTHER PUBLICATIONS

International Preliminary Report on Patentability; Application No. PCT/EP2018/081022; Issued: Feb. 12, 2021; 13 Pages.
(Continued)

Primary Examiner — Yaotang Wang
(74) Attorney, Agent, or Firm — Whitmyer IP Group LLC

(57) ABSTRACT

There is provided mechanisms for routing packets between a terminal device and a control system node via intermediate nodes on wireless paths in a wireless network. A method includes obtaining information on disturbances of wireless paths used for communicating packets of a traffic flow between the intermediate nodes in the wireless network. The method includes determining, based on the information on disturbances, mutual correlation between the disturbances of the wireless paths. The method includes routing the packets of the traffic flow between the terminal device and the control system node via some of the intermediate nodes and along disjoint wireless paths, whereby the packets are transmitted in parallel on the disjoint wireless paths, and wherein the disjoint wireless paths have mutual correlation not higher than a threshold correlation value.

19 Claims, 3 Drawing Sheets

(56) References Cited

U.S. PATENT DOCUMENTS

| | | | |
|---|---|---|---|
| 2003/0005149 A1 | 1/2003 | Haas et al. | |
| 2008/0247327 A1 | 10/2008 | Weil et al. | |
| 2010/0316033 A1* | 12/2010 | Atwal | H04W 74/002 |
| | | | 370/338 |
| 2012/0020222 A1* | 1/2012 | Nishioka | H04W 40/12 |
| | | | 370/235 |
| 2017/0164264 A1* | 6/2017 | Kato | H04W 40/14 |
| 2018/0176123 A1 | 6/2018 | Abdallah et al. | |
| 2020/0099709 A1* | 3/2020 | Vasseur | H04L 45/22 |
| 2020/0213343 A1* | 7/2020 | Bharrat | G06N 3/045 |
| 2020/0228446 A1* | 7/2020 | Geng | H04L 45/74 |

OTHER PUBLICATIONS

International Search Report and Written Opinion of the International Searching Authority; Application No. PCT/EP2018/081022; Completed: Jun. 24, 2019; Mailing Date: Jul. 3, 2019; 12 Pages.

\* cited by examiner

IDENTIFICATION OF ROBUST WIRELESS ROUTING PATHS

TECHNICAL FIELD

Embodiments presented herein relate to a method, a control system node, a computer program, and a computer program product for routing packets between a terminal device and the control system node via intermediate nodes on wireless paths in a wireless network.

BACKGROUND

Traditionally, routes and paths in mesh network are created to optimize the energy consumption of devices routing packets in the mesh network such that energy consumption is evenly spread out amongst these devices. This has been a research challenge within the field of wireless sensor networks (WSNs). WSNs are designed to support large networks of sensors, where the sensor collect data and send the data to a gateway or access point (such as a Wi-Fi access point or cellular base station). Data is mainly flowing uplink (i.e., from sensor to gateway or access point) and the traffic defined by the packets I which the data is transported, is generally considered to be of best effort type.

The process industry is today using wireless communication, such as mesh networks, for communicating non-critical data and control signals (such as data and control signals that do not need to be delivered before the deadline, i.e. in real-time). In order to use wireless communication also for critical data and control signals (such as data and control signals that need to be delivered in real-time or near real-time) the wireless network must support tough requirements on reliability, timeliness and fault-tolerance in addition to being energy effective. In addition, the mesh network needs to support downlink communication (i.e., from gateway or access point to sensor) as well in order to enable closed control loops.

In general terms, redundancy can be used to avoid single points of failures, device failures, transmission errors, packet losses, deadline misses, etc. Redundancy for real-time routing protocols differs in the way that real-time routing protocols also consider timely delivery of messages, e.g. not only relying on retransmissions in case of lost acknowledgements. However, it is more challenging in wireless networks than in wired networks to identify robust and redundant paths when routing packets.

Hence, there is a need for improved routing of packets in wireless networks.

SUMMARY

An object of embodiments herein is to provide efficient routing of packets in wireless networks, especially with respect to communication of critical data and control signals.

According to a first aspect there is presented a method for routing packets between a terminal device and a control system node via intermediate nodes on wireless paths in a wireless network. The method comprises obtaining information on disturbances of wireless paths used for communicating packets of a traffic flow between the intermediate nodes in the wireless network. The method comprises determining, based on the information on disturbances, mutual correlation between the disturbances of the wireless paths. The method comprises routing the packets of the traffic flow between the terminal device and the control system node via some of the intermediate nodes and along disjoint wireless paths, whereby the packets are transmitted in parallel on the disjoint wireless paths, and wherein the disjoint wireless paths have mutual correlation not higher than a threshold correlation value.

According to a second aspect there is presented a control system node for routing packets between a terminal device and the control system node via intermediate nodes on wireless paths in a wireless network. The control system node comprises processing circuitry. The processing circuitry is configured to cause the control system node to obtain information on disturbances of wireless paths used for communicating packets of a traffic flow between the intermediate nodes in the wireless network. The processing circuitry is configured to cause the control system node to determine, based on the information on disturbances, mutual correlation between the disturbances of the wireless paths. The processing circuitry is configured to cause the control system node to route the packets of the traffic flow between the terminal device and the control system node via some of the intermediate nodes and along disjoint wireless paths, whereby the packets are transmitted in parallel on the disjoint wireless paths, and wherein the disjoint wireless paths have mutual correlation not higher than a threshold correlation value.

According to a third aspect there is presented a computer program for routing packets between a terminal device and a control system node via intermediate nodes on wireless paths in a wireless network, the computer program comprising computer program code which, when run on the control system node, causes the control system node to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this provides efficient routing of packets in wireless networks.

Advantageously, since the packets are transmitted in parallel on disjoint wireless paths, this provides efficient routing of packets in wireless networks even with respect to communication of critical data and control signals. Embodiments presented herein may thus advantageously be used in Time-Sensitive Networking (TSN) applications with high requirements on low latency and high availability.

Advantageously this enables support of new applications, such as reliable control, over wireless networks.

Advantageously this enables new applications in combination with monitoring applications in the same wireless ecosystem.

Advantageously this eliminates the need to install dedicated and parallel wireless networks for a single purpose.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
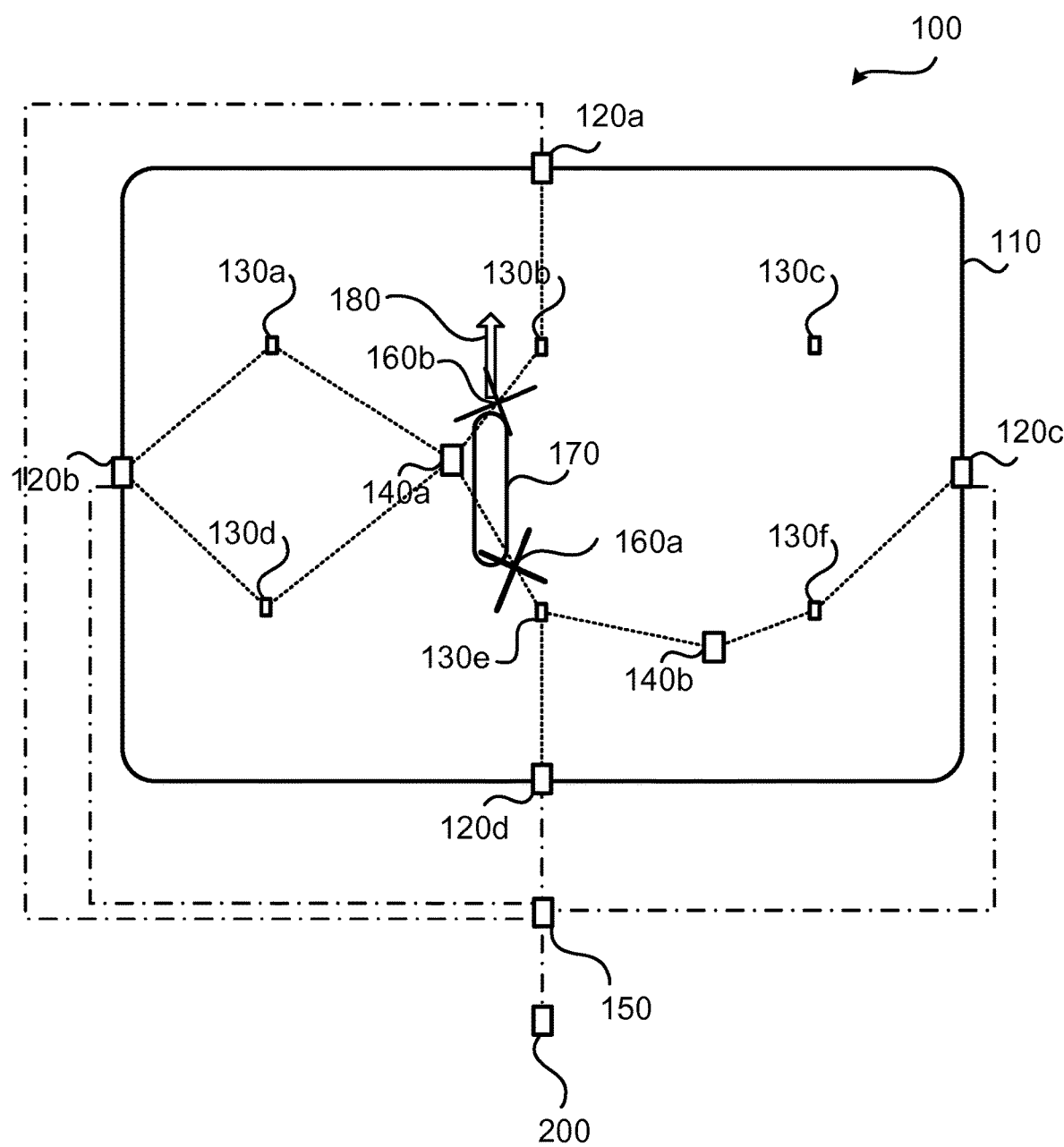
FIG. 1 is a schematic diagram illustrating a communication network according to embodiments.

FIG. 1 is a schematic diagram illustrating a communication network 100 where embodiments presented herein can be applied. In some examples the communication network 100 is part of an industrial plant.

The communication network 100 has a wired part and a wireless part. Thus, packets of traffic flows are communicated over wireless paths (such as over radio links) in the wireless part and over wired paths (such as over fiber optic cables, copper wires, or the like) in the wired part. In particular, the communication network 100 comprises a wireless network 110. In some examples the wireless network 110 is a wireless mesh network. It is noted that only some of all possible wireless paths are illustrated in the example of FIG. 1.

The wireless network 110 is interconnected to the wired part of the communication network 100 via gateways 120a, 120b, 120c, 120d. Thus the gateways 120a, 120b, 120c, 120d are configured for communication with entities in the wired part of the communication network 100 over wired links and with entities in the wireless network 110 over wireless links. In some examples the gateways 120a, 120b, 120c, 120d are implemented as access points.

The gateways 120a, 120b, 120c, 120d provide access to the wired part of the communication network 100 for intermediate nodes 130a, 130b, 130c, 130d, 130e, 130f in the wireless network 110. Thus the intermediate nodes 130a, 130b, 130c, 130d, 130e, 130f are configured for communication with each other, as well as with the gateways 120a, 120b, 120c, 120d, over wireless paths. Thus, in some examples the packets between the intermediate nodes 130a, 130b, 130c, 130d, 130e, 130f and a control system node 200 (see below) are routed via a gateway 120a, 120b, 120c, 120d interfacing the wireless network 110, and the packets are routed on a wired path between the gateway 120a, 120b, 120c, 120d and the control system node 200. In some examples the intermediate nodes 130a, 130b, 130c, 130d, 130e, 130f are switches.

In turn, the intermediate nodes 130a, 130b, 130c, 130d, 130e, 130f provide network access to terminal devices 140a, 140b. Thus the terminal devices 140a, 140b are configured for communication with the intermediate nodes 130a, 130b, 130c, 130d, 130e, 130f over wireless paths. In some examples the terminal devices 140a, 140b are networked pieces of industrial equipment.

The wired part of the communication network 100 comprises a server 150 and a control system node 200. In some examples the control system node 200 is an industrial equipment control system node 200. In some examples the server 150 is part of, or collocated with, the control system node 200.

As disclosed above there is a need for improved routing of packets in wireless networks 110. One example of such a need is illustrated in FIG. 1 by means of disturbances 160a, 160b on two of the wireless links. The disturbances 160a, 160b might be caused by an object 170 moving along a direction as indicated by arrow 180. The object 170 could be a truck, a lorry, etc. The disturbances 160a, 160b negatively affect the performance of the wireless network 110, and especially the wireless link between terminal device 140a and intermediate node 130b and the wireless link between terminal device 140a and intermediate node 130e. It can thus here be assumed that similar channel conditions are experienced for these two wireless links within a given time window, thus causing these wireless links to experience joint changes in the link quality. Non-limiting examples of channel conditions are channel strength, channel throughput, bit error rate, packet error rate, channel state information (CSI), etc.

In general terms, the embodiments disclosed herein aims to solve this problem by detecting correlated disturbances on the wireless paths and by avoiding redundant information to be sent to, or from, the terminal devices 140a, 140b, over wireless paths that would be victim of correlated disturbances.

The embodiments disclosed herein in particular relate to mechanisms for routing packets between a terminal device 140a, 140b and a control system node 200 via intermediate nodes 130a, 130b, 130c, 130d, 130e, 130f on wireless paths in a wireless network 110. In order to obtain such mechanisms there is provided a control system node 200, a method performed by the control system node 200, a computer program product comprising code, for example in the form of a computer program, that when run on a control system node 200, causes the control system node 200 to perform the method, thereby providing a centralized realization of the embodiments disclosed herein. Additionally or alternatively, at least some of the steps might be performed by the intermediate nodes 130a, 130b, 130c, 130d, 130e, 130f in a collaborative manner, thereby providing a distributed realization of the embodiments disclosed herein.

Figure 2:
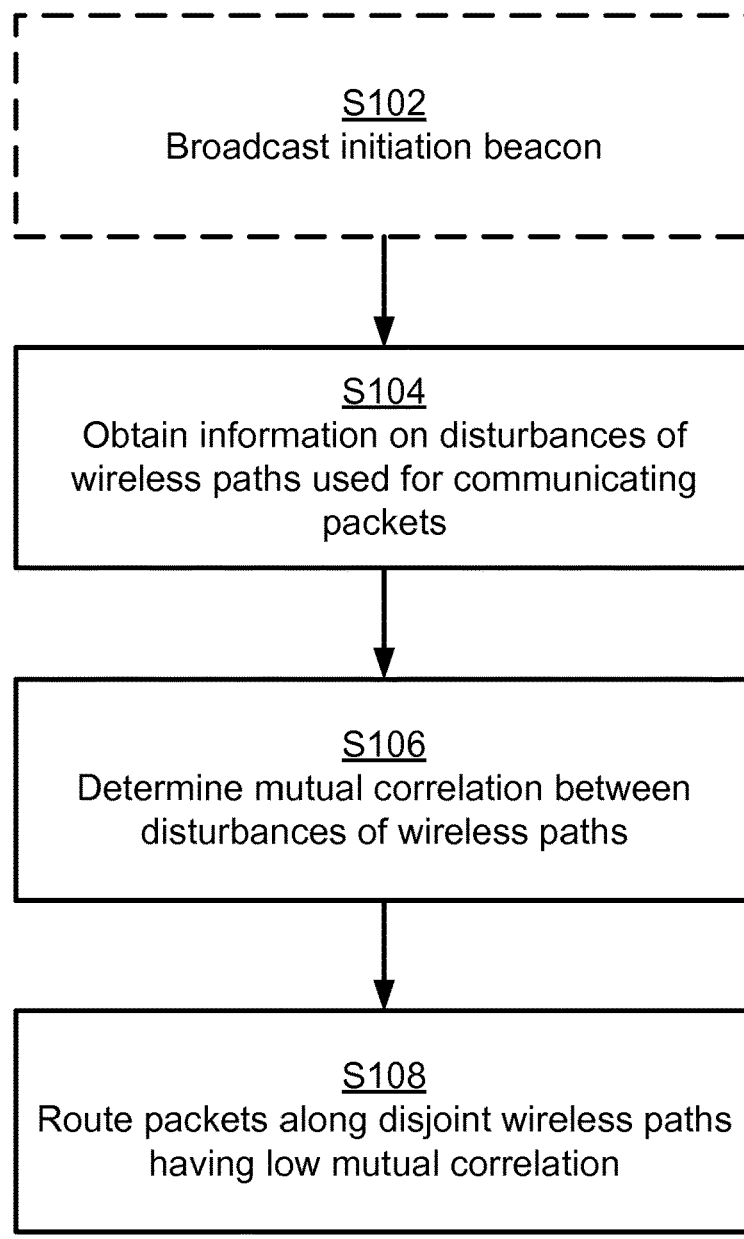
FIG. 2 is a flowchart of a method according to an embodiment.

FIG. 2 is a flowchart illustrating embodiments of methods for routing packets between a terminal device 140a, 140b and a control system node 200 via intermediate nodes 130a, 130b, 130c, 130d, 130e, 130f on wireless paths in a wireless network 110. The methods are performed by the control system node 200. The methods are advantageously carried out by the control system node 200 executing one or more computer programs 520.

In some examples the control system node 200 initiates all intermediate nodes 130a, 130b, 130c, 130d, 130e, 130f that are part of, or will be part of, the wireless network 110 to monitor wireless links by broadcasting an initiation beacon signal to all the intermediate nodes 130a, 130b, 130c, 130d, 130e, 130f in the wireless network 110. Particularly, according to an embodiment the control system node 200 is configured to perform (optional) step S102:

S102: The control system node 200 broadcasts an initiation beacon signal to all the intermediate nodes 130a, 130b, 130c, 130d, 130e, 130f in the wireless network 110.

In some examples the initiation beacon signal is broadcasted via the gateways 120a, 120b, 120c, 120d.

There could be different types of initiation beacon signals. In some examples the beacon signal comprises information, such as hop number, which weights to use for determining the most suitable intermediate node 130a, 130b, 130c, 130d, 130e, 130f (and gateway 120a, 120b, 120c, 120d) for routing packets to, etc. Non-limiting examples of such weights are Received Signal Strength Indicator (RSSI), Link Quality Indicator (LQI), energy capacity, etc.

In some examples the intermediate nodes 130a, 130b, 130c, 130d, 130e, 130f are preconfigured to monitor the wireless links and then there is not any need for an initiation beacon signal to be broadcasted.

The intermediate nodes 130a, 130b, 130c, 130d, 130e, 130f are configured to monitor the wireless links to neighboring intermediate nodes 130a, 130b, 130c, 130d, 130e, 130f in order to detect joint changes in the link quality of the wireless links. The intermediate nodes 130a, 130b, 130c, 130d, 130e, 130f are configured to report the joint changes to the control system node 200.

In particular, in step S104 information on disturbances 160a, 060b of wireless paths used for communicating packets of a traffic flow between the intermediate nodes 130a, 130b, 130c, 130d, 130e, 130f in the wireless network 110 is obtained. Step S104 might be performed by the control node 200 or by one or more of the intermediate nodes 130a, 130b, 130c, 130d, 130e, 130f, depending on the realization.

The control system node 200, or one or more of the intermediate nodes 130a, 130b, 130c, 130d, 130e, 130f, could then identify correlated disturbances from the joint changes in the link quality.

In particular, in step S106, mutual correlation between the disturbances 160a, 160b of the wireless paths is determined based on the information on disturbances 160a, 160b as obtained in step S104. Step S106 might be performed by the control node 200 or by one or more of the intermediate nodes 130a, 130b, 130c, 130d, 130e, 130f, depending on the realization.

The information on disturbances 160a, 160b as obtained in step S140 could be supplemented by other type of information indicative of possible disturbances of wireless paths in the network 110. This other type of information might be historical or predicted disturbances of wireless paths in the network 110. The predicted disturbances could be obtained using artificial intelligence (AI) or machine learning (ML) as trained on data of historical disturbances. Hence, in some examples the mutual correlation in step S106 is also based on such other type of information indicative of possible disturbances.

The determined mutual correlation is then used when determining via which intermediate nodes 130a, 130b, 130c, 130d, 130e, 130f the packets of the traffic flow between the terminal device 140a, 140b and the control system node 200 should be routed.

In particular, in step S108 the packets of the traffic flow between the terminal device 140a, 140b and the control system node 200 are routed. The packets are routed via some of the intermediate nodes 130a, 130b, 130c, 130d, 130e, 130f and along disjoint wireless paths. The packets are transmitted in parallel on the disjoint wireless paths. The disjoint wireless paths have mutual correlation not higher than a threshold correlation value. Step S108 might be performed by the control node 200 or by one or more of the intermediate nodes 130a, 130b, 130c, 130d, 130e, 130f, depending on the realization.

With packets being transmitted in parallel is generally referred to that one and the same packet is simultaneously transmitted on two or more disjoint wireless paths. In some examples all packets are simultaneously transmitted on two or more disjoint wireless paths. In other examples only those packets that, according to some criterion, are considered as more important than other packets are simultaneously transmitted on two or more disjoint wireless paths. There could be different types of criteria. For example, packets carrying control information, control instructions, alarm signals, etc. might be regarded as more important than packets only carrying data.

Transmitting the packets in parallel increases redundancy, especially when one and the same packet is transmitted on two or more disjoint wireless paths. When the packets are transmitted in parallel both spatial and temporal diversity can be taken advantage of.

Selecting the wireless paths to be disjoint such that disjoint wireless paths have mutual correlation not higher than the threshold correlation value increases the probability of packets on at least one of the disjoint wireless paths to successfully reach its destination.

The routing might thus be determined such that disjoint wireless paths with uncorrelated probability of simultaneous packet loss are created, e.g. such that a piece of moving equipment in the production plant will not shadow or otherwise disturb both wireless paths at the same time. This enables improved fault tolerance, reliability, and/or energy efficiency compared to if the packets would have been routed via correlated wireless paths.

In the example of FIG. 1, the wireless link between terminal device 140a and intermediate node 130b and the wireless link between terminal device 140a and intermediate node 130e would, although being more than 90° separated from each other at terminal device 140a, not fulfil the criterion of having a mutual correlation not higher than a threshold correlation value because of the disturbances 160a, 160b affecting these two wireless links. At least one of the other wireless links would then be selected for terminal device 140a in step S108, such as one of the wireless links between terminal device 140a and intermediate node 130a and between terminal device 140a and intermediate node 130d. If an additional criterion is that the wireless paths must terminate at mutually different gateways, then one of these latter wireless links could be selected for terminal device 140a in combination with one of the wireless link between terminal device 140a and intermediate node 130b and the wireless link between terminal device 140a and intermediate node 130e.

In the example of FIG. 1, the two wireless paths for terminal device mob are already disjoint: a first wireless path is defined by the wireless link between terminal device 140b and intermediate node 130f, and the wireless link between intermediate node 130f and gateway 120c; and a second wireless path is defined by the wireless link between terminal device 140b and intermediate node 130e, and the wireless link between intermediate node 130e and gateway 120d. Not only are these wireless paths disjoint, they are also almost 180° separated from each other at terminal device 140b.

Step S108 can be repeated for each terminal device 140a, 140b.

Steps S104, S106, S108 could collectively define a topology discovery algorithm according to which it is determined which wireless paths to use in the wireless network 110 for routing packets between the terminal device 140a, 140b and the control system node 200.

In some examples the control system node 200 selects a first wireless path along some of the intermediate nodes 130a, 130b, 130c, 130d, 130e, 130f between the terminal device 140a, 140b and one of the gateways 120a, 120b, 120c, 120d. The first wireless path could, for example, be defined by the wireless links with the best accumulated link quality between all intermediate nodes along the wireless path between the terminal device 140a, 140b and one of the gateways 120a, 120b, 120c, 120d.

In some examples the control system node 200 further selects at least one second wireless path along some of the intermediate nodes 130a, 130b, 130c, 130d, 130e, 130f between the terminal device 140a, 140b and one of the gateways 120a, 120b, 120c, 120d. One second wireless path could be selected such that it has the second highest accumulated link quality between all intermediate nodes along the wireless path between the terminal device 140a, 140b and one of the gateways 120a, 120b, 120c, 120d. in some example another second wireless path is selected such that it has the highest accumulated link quality between all intermediate nodes along the wireless path between the terminal device 140a, 140b and one of the gateways 120a, 120b, 120c, 120d, but only considering those intermediate nodes which have mutual correlation to those intermediate nodes defined by the first wireless path not being higher than the threshold correlation value.

The packets could thus be routed between the terminal devices 140a, 140b and the control system node 200 along a first wireless path, a second wireless path, and another second wireless path. Further, the packets might be routed over several disjoint wireless paths for increased packet reliability whilst still meeting the packet deadline.

Embodiments relating to further details of routing packets between a terminal device 140a, 140b and a control system node 200 via intermediate nodes 130a, 130b, 130c, 130d, 130e, 130f on wireless paths in a wireless network no as performed by the control system node 200 will now be disclosed.

It could typically be that the object 170 causing the disturbances 160a, 160b is non-stationary. That is, the object 170 could typically be moving, as indicated by arrow 180 in the example of FIG. 1. This could typically cause the radio environment to change and thus cause the performance of different wireless links to be negatively affected by the object 170 from one time to another. In some examples the mutual correlation and the routing of the packets are therefore performed within the same time window such that the routing is executed whilst the determined mutual correlation still is valid. Particularly, according to an embodiment, the information on disturbances 160a, 160b is collected within a time window, and wherein the routing is performed within the same time window. This enables the routing to be based on near-instantaneous information on the disturbances 160a, 160b.

In some examples the length of time window depends on channel conditions that cause the disturbances 160a, 160b of the wireless paths. Particularly, according to an embodiment, the disturbances 160a, 160b are caused by varying channel conditions in the wireless network 110, and the time window has a time length that depends on characteristics of the varying channel conditions. One such characteristics could be related to the size of the object 170; the larger the size the longer the disturbances 160a, 160b are likely to be caused for the same part of the wireless network 110. One such characteristics could be related to the density of the object 170; the higher the density the more severe disturbances 160a, 160b are likely to be. One such characteristics could be related to the speed in which the object 170 is moving; the higher the speed the more rapidly the disturbances 160a, 160b are likely to move from one part of the wireless network 110 to another part of the wireless network 110. Examples of channel conditions, that thus might vary according to any of these characteristics, have been given above.

In some examples the packets are routed such that the disjoint wireless paths terminate at mutually different gateways 120a, 120b, 120c, 120d. That is, according to an embodiment, each of the disjoint wireless paths are routed via a separate gateway 120a, 120b, 120c, 120d.

In some examples the intermediate nodes 130a, 130b, 130c, 130d, 130e, 130f are grouped according to the determined mutual correlation between the disturbances 160a, 160b. Hence, the determined mutual correlation can be used to define subsets of the intermediate nodes 130a, 130b, 130c, 130d, 130e, 130f. Intermediate nodes in the same subset are associated with disturbances 160a, 160b of higher mutual correlation than those other intermediate nodes that are not in the same subset. Hence, according to an embodiment the intermediate nodes 130a, 130b, 130c, 130d, 130e, 130f are, based on the determined mutual correlation between the disturbances 160a, 160b, grouped into at least two subsets of intermediate nodes 130a, 130b, 130c, 130d.

In some examples each of the packets is routed along the disjoint wireless paths via a first subset of the intermediate nodes 130a, 130b, 130c, 130d, 130e, 130f in one of the disjoint wireless paths and via a second subset of the intermediate nodes 130a, 130b, 130c, 130d, 130e, 130f in another of the disjoint wireless paths, where the first subset and the second subset are disjoint subsets (i.e., do not have any intermediate nodes 130a, 130b, 130c, 130d, 130e, 130f at all in common). That is, according to an embodiment, each of the packets is routed along the disjoint wireless paths via at least one respective intermediate node 130a, 130b, 130c, 130d, 130e, 130f in each disjoint wireless path.

There could be different examples of the threshold correlation value. According to an embodiment the threshold correlation value corresponds to wireless paths of uncorrelated disturbances 160a, 160b. For example, in order to achieve fault tolerance, the packets might be routed such that not all the disjoint wireless paths are via an intermediate node that has no failover neighbors.

Further, the packets might be routed only via intermediate nodes 130a, 130b, 130c, 130d, 130e, 130f that have a harvester or main power for relaying and routing instead of via battery operated intermediate nodes 130a, 130b, 130c, 130d, 130e, 130f. Particularly, according to an embodiment, the packets are routed only via those intermediate nodes 130a, 130b, 130c, 130d, 130e, 130f that have a remaining operating power above a threshold power value.

The topology discovery algorithm can be implemented in either a centralized manner as described above or in a decentralized manner in each intermediate node. Hence, in some aspects at least part of the functionality of the control system node 200 is implemented in at least some of the intermediate nodes 130a, 130b, 130c, 130d, 130e, 130f.

Figure 3:
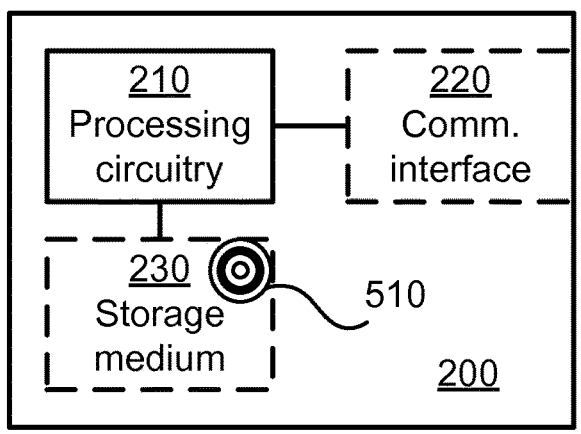
FIG. 3 is a schematic diagram showing functional units of a control system node according to an embodiment.

FIG. 3 schematically illustrates, in terms of a number of functional units, the components of a control system node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 510 (as in FIG. 5), e.g. in the form of a storage medium 230. The processing circuitry 210 may further be provided as at least one application specific integrated circuit (ASIC), or field programmable gate array (FPGA).

Particularly, the processing circuitry 210 is configured to cause the control system node 200 to perform a set of operations, or steps, as disclosed above. For example, the storage medium 230 may store the set of operations, and the processing circuitry 210 may be configured to retrieve the set of operations from the storage medium 230 to cause the control system node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control system node 200 may further comprise a communications interface 220 at least configured for communications with other nodes, functions, entities, and devices of the communication network 100. As such the communications interface 220 may comprise one or more transmitters and receivers, comprising analogue and digital components. The processing circuitry 210 controls the general operation of the control system node 200 e.g. by sending data and control signals to the communications interface 220 and the storage medium 230, by receiving data and reports from the communications interface 220, and by retrieving data and instructions from the storage medium 230. Other components, as well as the related functionality, of the control system node 200 are omitted in order not to obscure the concepts presented herein.

Figure 4:
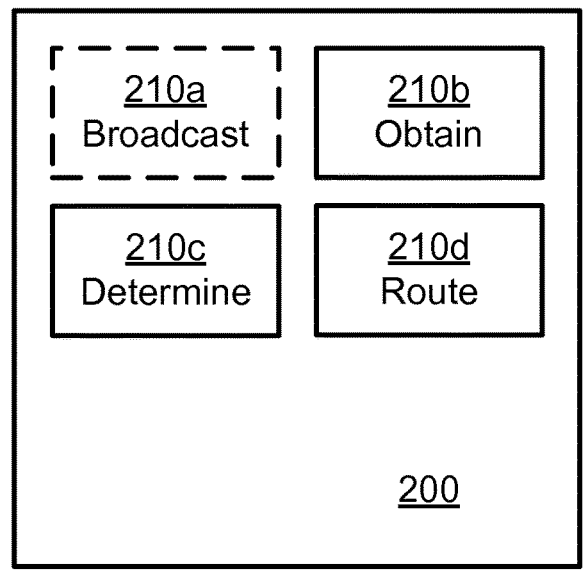
FIG. 4 is a schematic diagram showing functional modules of a control system node according to an embodiment.

FIG. 4 schematically illustrates, in terms of a number of functional modules, the components of a control system node 200 according to an embodiment. The control system node 200 of FIG. 4 comprises a number of functional modules; an obtain module 210b configured to perform step S104, a determine module 210c configured to perform step S106, and a route module 210d configured to perform step S108. The control system node 200 of FIG. 4 may further comprise a number of optional functional modules, such as a broadcast module 210a configured to perform step S102. In general terms, each functional module 210a-210d may in one embodiment be implemented only in hardware and in another embodiment with the help of software, i.e., the latter embodiment having computer program instructions stored on the storage medium 230 which when run on the processing circuitry makes the control system node 200 perform the corresponding steps mentioned above in conjunction with FIG. 4. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The control system node 200 may be provided as a standalone device or as a part of at least one further device. For example, the control system node 200 may be provided as part of a control system of an industrial plant. Alternatively, functionality of the control system node 200 may be distributed between at least two devices, or nodes.

Thus, a first portion of the instructions performed by the control system node 200 may be executed in a first device, and a second portion of the of the instructions performed by the control system node 200 may be executed in a second device; the herein disclosed embodiments are not limited to any particular number of devices on which the instructions performed by the control system node 200 may be executed. Hence, the methods according to the herein disclosed embodiments are suitable to be performed by a control system node 200 residing in a cloud computational environment. Therefore, although a single processing circuitry 210 is illustrated in FIG. 3 the processing circuitry 210 may be distributed among a plurality of devices, or nodes. The same applies to the functional modules 210a-210d of FIG. 4 and the computer program 520 of FIG. 5.

Figure 5:
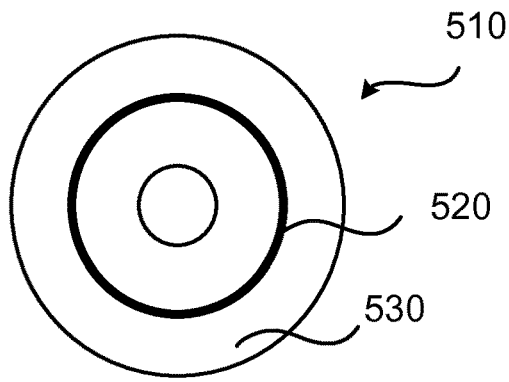
FIG. 5 shows one example of a computer program product comprising computer readable storage medium according to an embodiment.

FIG. 5 shows one example of a computer program product 510 comprising computer readable storage medium 530. On this computer readable storage medium 530, a computer program 520 can be stored, which computer program 520 can cause the processing circuitry 210 and thereto operatively coupled entities and devices, such as the communications interface 220 and the storage medium 230, to execute methods according to embodiments described herein. The computer program 520 and/or computer program product 510 may thus provide means for performing any steps as herein disclosed.

In the example of FIG. 5, the computer program product 510 is illustrated as an optical disc, such as a CD (compact disc) or a DVD (digital versatile disc) or a Blu-Ray disc. The computer program product 510 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 520 is here schematically shown as a track on the depicted optical disk, the computer program 520 can be stored in any way which is suitable for the computer program product 510.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:
1. A method for routing packets between a terminal device and a control system node via intermediate nodes on wireless paths in a wireless network, the method comprising:
obtaining information on disturbances of wireless paths used for communicating packets of a traffic flow between the intermediate nodes in the wireless network, wherein the disturbances are caused by a non-stationary object;
determining, based on the information on disturbances, mutual correlation between the disturbances of the wireless paths;
using the determined mutual correlation to determine which of the intermediate nodes the packets of the traffic flow should be routed; and
routing the packets of the traffic flow between the terminal device and the control system node via some of the intermediate nodes and along disjoint wireless paths, whereby the same packets are simultaneously transmitted in parallel on the disjoint wireless paths having mutual correlation not higher than a threshold correlation value;
wherein the threshold correlation value corresponds to the wireless paths having an uncorrelated probability of simultaneous packet loss.

2. The method according to claim 1, wherein the information on disturbances is collected within a time window, and wherein the routing is performed within the same time window.

3. The method according to claim 2, wherein the time window has a time length that depends on characteristics of varying channel conditions in the wireless network.

4. The method according to claim 1, wherein the packets between the intermediate nodes and the control system node are routed via a gateway interfacing the wireless network, and wherein the packets are routed on a wired path between the gateway and the control system node.

5. The method according to claim 4, wherein each of the disjoint wireless paths are routed via a separate gateway.

6. The method according to claim 1, wherein the threshold correlation value corresponds to wireless paths of uncorrelated disturbances.

7. The method according to claim 1, wherein the intermediate nodes are, based on the determined mutual correlation between the disturbances, grouped into at least two subsets of intermediate nodes.

8. The method according to claim 7, wherein each of the packets is routed along the disjoint wireless paths via a first subset of the intermediate nodes in one of the disjoint wireless paths and via a second subset of the intermediate nodes in another of the disjoint wireless paths, where the first subset and the second subset are disjoint subsets.

9. The method according to claim 1, wherein each of the packets is routed along the disjoint wireless paths via at least one intermediate node in each disjoint wireless path.

10. The method according to claim 1, wherein the packets are routed only via those intermediate nodes having a remaining operating power above a threshold power value.

11. The method according to claim 1, further comprising:
broadcasting an initiation beacon signal to all the intermediate nodes in the wireless network.

12. The method according to claim 1, wherein the intermediate nodes are switches.

13. The method according to claim 1, wherein the wireless network is a wireless mesh network.

14. The method according to claim 1, wherein the terminal device is a networked piece of industrial equipment.

15. The method according to claim 1, wherein the control system node is an industrial equipment control system node.

16. The method according to claim 1, wherein each of the packets is transmitted on at least two disjoint wireless paths when the packets are redundantly transmitted.

17. A control system node for routing packets between a terminal device and the control system node via intermediate nodes on wireless paths in a wireless network, the control system node comprising processing circuitry, the processing circuitry being configured to cause the control system node to:
obtain information on disturbances of wireless paths used for communicating packets of a traffic flow between the intermediate nodes in the wireless network, wherein the disturbances are caused by a non-stationary object;
determine, based on the information on disturbances, mutual correlation between the disturbances of the wireless paths;
use the determined mutual correlation to determine which of the intermediate nodes the packets of the traffic flow should be routed; and
route the packets of the traffic flow between the terminal device and the control system node via some of the intermediate nodes and along disjoint wireless paths, whereby the same packets are simultaneously transmitted in parallel on the disjoint wireless paths having mutual correlation not higher than a threshold correlation value;
wherein the threshold correlation value corresponds to the wireless paths having an uncorrelated probability of simultaneous packet loss.

18. The control system node according to claim 17, further being configured to perform a method including the steps of:
obtaining information on disturbances of wireless paths used for communicating packets of a traffic flow between the intermediate nodes in the wireless network, wherein the disturbances are caused by varying channel conditions in the wireless network;
determining, based on the information on disturbances, mutual correlation between the disturbances of the wireless paths; and
routing the packets of the traffic flow between the terminal device and the control system node via some of the intermediate nodes and along disjoint wireless paths, whereby the packets are transmitted in parallel on the disjoint wireless paths, and wherein the disjoint wireless paths have mutual correlation not higher than a threshold correlation value.

19. A computer program product comprising a computer program for routing packets between a terminal device and a control system node via intermediate nodes on wireless paths in a wireless network, the computer program comprising computer code which, when run on processing circuitry of the control system node, causes the control system node to:
obtain information on disturbances of wireless paths used for communicating packets of a traffic flow between the intermediate nodes in the wireless network, wherein the disturbances are caused by a non-stationary object;
determine, based on the information on disturbances, mutual correlation between the disturbances of the wireless paths;
use the determined mutual correlation to determine which of the intermediate nodes the packets of the traffic flow should be routed; and
route the packets of the traffic flow between the terminal device and the control system node via some of the intermediate nodes and along disjoint wireless paths, whereby the same packets are simultaneously transmitted in parallel on the disjoint wireless paths having mutual correlation not higher than a threshold correlation value, and wherein the threshold correlation value corresponds to the wireless paths having an uncorrelated probability of simultaneous packet loss, and a non-transitory computer readable storage medium on which the computer program is stored.

\* \* \* \* \*